May 13, 1930.  R. FLURY  1,758,659

BUSHING

Filed July 12, 1926

Inventor
Richard Flury

By Whittemore Hulbert Whittemore
& Belknap
Attorneys

Patented May 13, 1930

1,758,659

UNITED STATES PATENT OFFICE

RICHARD FLURY, OF DETROIT, MICHIGAN, ASSIGNOR TO GEMMER MANUFACTURING COMPANY, OF DETROIT, MICHIGAN, A CORPORATION OF MICHIGAN

BUSHING

Application filed July 12, 1926. Serial No. 121,971.

The invention relates to bushings more particularly designed for use in connection with commercial drawn tubing and in other places where there are slight variations in the dimensions of the cooperating members. It is the object of the invention to provide for automatic adjustment to such varying dimensions without the development of objectionable stresses which might distort the form or otherwise interfere with proper functioning. To this end the invention consists in the construction as hereinafter set forth.

Figure 1:
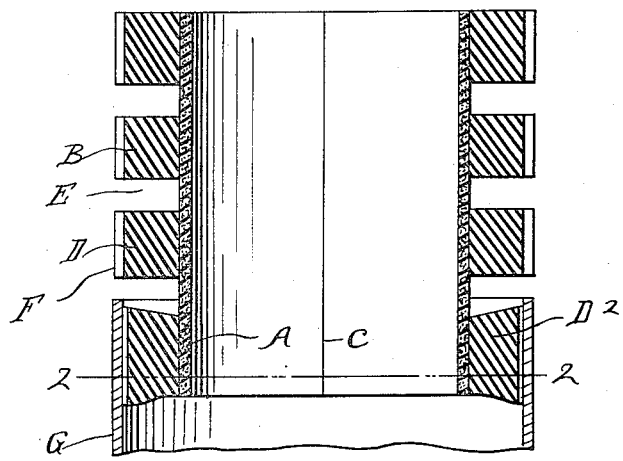
Figure 1 is a central longitudinal section through the bushing showing the same in partial engagement with a surrounding tubing.
Figure 2:
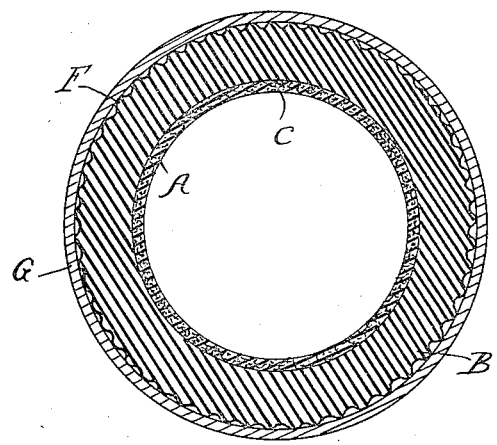
Figure 2 is a cross section of Figure 1.
Figure 3:
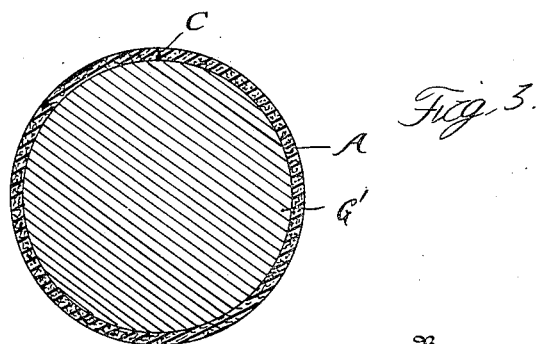
Figure 3 is a cross section illustrating the manner of forming the split bearing.

My improved construction relates to that type of adjustable bushing in which a collapsible or expansible sleeve or bearing member is surrounded by a body of yieldable resilient material such as rubber. Such a bushing may be inserted within outer tubular casings varying slightly in dimensions (as is invariably the case with drawn or welded metal tubing) and the yielding of the rubber will compensate for such variations. Also the collapsible or expansible sleeve or bearing member will similarly adjust itself to inner tubes or rods which vary in dimensions. Inasmuch, however, as rubber is practically incompressible and when contracted in one dimension, must expand in another, there is a tendency to distort the form of the bearing. Thus, the material in the center of the body when circumferentially compressed, will exert a much greater pressure radially inward than at the ends of the body where a longitudinal displacement is unopposed. As a consequence, the bearing is either distorted or will exert a greater pressure at the center than at the ends which is objectionable.

My improvement consists esentially in the means for equalizing the stresses in the yieldable body when subjected to a radial distortion. This is preferably accomplished by ribbing the peripheral surface so that the intermediate grooves will provide space for lateral displacement. If, as is generally the case, the bearing journaled therein is a revolvable member, it is desirable to avoid displacement of said bearing by torque stresses and therefore the ribs of the peripheral surface preferably extend circumferentially. It may, however, be desirable to supplement such circumferentially extending ribs by longitudinally extending serrations, these being limited to depth but providing a more readily yieldable surface that will exclude water and oil.

As shown, A is the inner lining or bearing member and B the surrounding yielding body member of my improved bushing. The bearing member A is preferably rendered expansible by longitudinally severing the same as indicated along the line C. It may be made of any suitable material, but preferably of rubber, having incorporated therein a lubricating material such as graphite, and which has been vulcanized to a greater degree of hardness than the surrounding body B.

As previously stated, the body B is provided at its periphery with a series of circumferentially extending ribs D, or, what is the same thing, has a series of circumferential slots E which separate the material into such ribs. These slots are so distributed that the ribs therebetween will be of substantially uniform width and the space is sufficient to accommodate any increase in width due to radial distortion. The outer surfaces of the ribs are preferably serrated as indicated at F, but these serrations are not of sufficient depth to produce loss of stability and merely reduce the pressure required for adjustment.

In the manufacture of the bushing the material forming the bearing A is wrapped around a suitable mandrel G' with its ends butting along the line C, or it is wrapped around a mandrel and then cut longitudinally before vulcanizing. It is then preferably vulcanized to a certain degree of hardness after which it is surrounded with the material for forming the body B and further vulcanized. The effect is to produce in the members A and B different degrees of hardness, the member A being suitable for a bearing and the member B sufficiently yielding for adjustment. After removal of the bushing from the mold it may be expanded as, for instance, by the insertion of an enlarged mandrel which would cause it to crack along the line C.

As shown in Figure 1, the outer tubular member G is sleeved over the end portion of the bushing, thereby contracting the rib $D^2$ and increasing the width thereof. The small ribs between the serrations F are also compressed and to a greater or less extent conform to the surface of the tube. When the bushing is pressed completely within the tube, all of the ribs will be similarly compressed, with the result that the radially inward pressure on all portions of the bearing member A will be substantially equal and will exert approximately equal pressure on the inner tube. Furthermore, the butting ends of the member A will prevent any contraction in diameter of said member from the original diameter. However, in designing the construction the internal diameter of the member A is preferably slightly greater than the minimum external diameter of the variable size tubing or rod engaging the bushing. The amount of clearance is not enough to be objectionable with such minimum size and reduces the amount of expansion of the bearing required for the maximum size of variation. Thus where the bushing is used with such maximum size, the pressure of the bearing, due to the resilient body B, will not be objectionably great.

What I claim as my invention is:

1. An adjustable bushing comprising a body provided with a series of circumferentially extending resilient ribs and intermediate slots providing clearance for expansion in width of said ribs under radial compression.

2. An adjustable bushing comprising a bearing member and an adjacent body of yieldable resilient material circumferentially slotted to divide the periphery thereof into a series of radially compressible ribs.

3. An adjustable bushing comprising a bearing member and an adjacent body of resilent compressible material circumferentially slotted to form a series of ribs, said ribs being peripherally serrated in a direction transverse to said slots.

4. An adjustable bushing comprising a bearing member, of an internal diameter slightly in excess of the minimum external diameter of the member for which it is designed, said bearing being longitudinally split to permit of radial expansion and having normally butting shoulders at said split and a surrounding body of resilient compressible material circumferentially slotted to form a series of radially compressible ribs the external diameter of which is greater than the maximum diameter of tubular member in which the bearing is to be placed.

In testimony whereof I affix my signature.

RICHARD FLURY.